United States Patent [19]

Lesieur et al.

[11] 4,181,503
[45] Jan. 1, 1980

[54] PROCESS FOR ALTERNATELY STEAM REFORMING SULFUR CONTAINING HYDROCARBONS THAT VARY IN OXYGEN CONTENT

[75] Inventors: Roger R. Lesieur, Enfield; Herbert J. Setzer, Ellington; James R. Hawkins, Tolland, all of Conn.

[73] Assignee: United Technologies Corporation, Hartford, Conn.

[21] Appl. No.: 956,301

[22] Filed: Oct. 30, 1978

[51] Int. Cl.$^2$ .................... C10G 13/30; C01B 2/14
[52] U.S. Cl. .................... 48/196 A; 48/197 R; 48/214 A; 252/373; 423/650; 423/652
[58] Field of Search .................... 208/211, 210, 89; 252/373; 423/650, 651, 652, 219, 230, 244 R; 48/196 R, 196 A, 197 R, 214 A

[56] References Cited

U.S. PATENT DOCUMENTS

| 1,960,212 | 5/1934 | Walker | 423/219 |
| 2,970,034 | 1/1961 | Andersen et al. | 423/219 |
| 3,476,534 | 11/1969 | Buswell et al. | 423/651 |
| 3,480,417 | 11/1969 | Setzer | 48/214 A |
| 3,551,124 | 12/1970 | Iwaki et al. | 48/197 R |

Primary Examiner—S. Leon Bashore
Assistant Examiner—Peter F. Kratz
Attorney, Agent, or Firm—Stephen E. Revis

[57] ABSTRACT

In the hydrotreating and steam reforming of an oxygen and sulfur bearing hydrocarbon fuel the oxygen is first removed in an oxidizer containing a bed of platinum catalyst, the inlet temperature being well below 1000° F. and preferably on the order of 300° F. The sulfur in the fuel does not harm the oxidizer catalyst and may be removed downstream by known hydrodesulfurization techniques prior to reforming.

6 Claims, 1 Drawing Figure

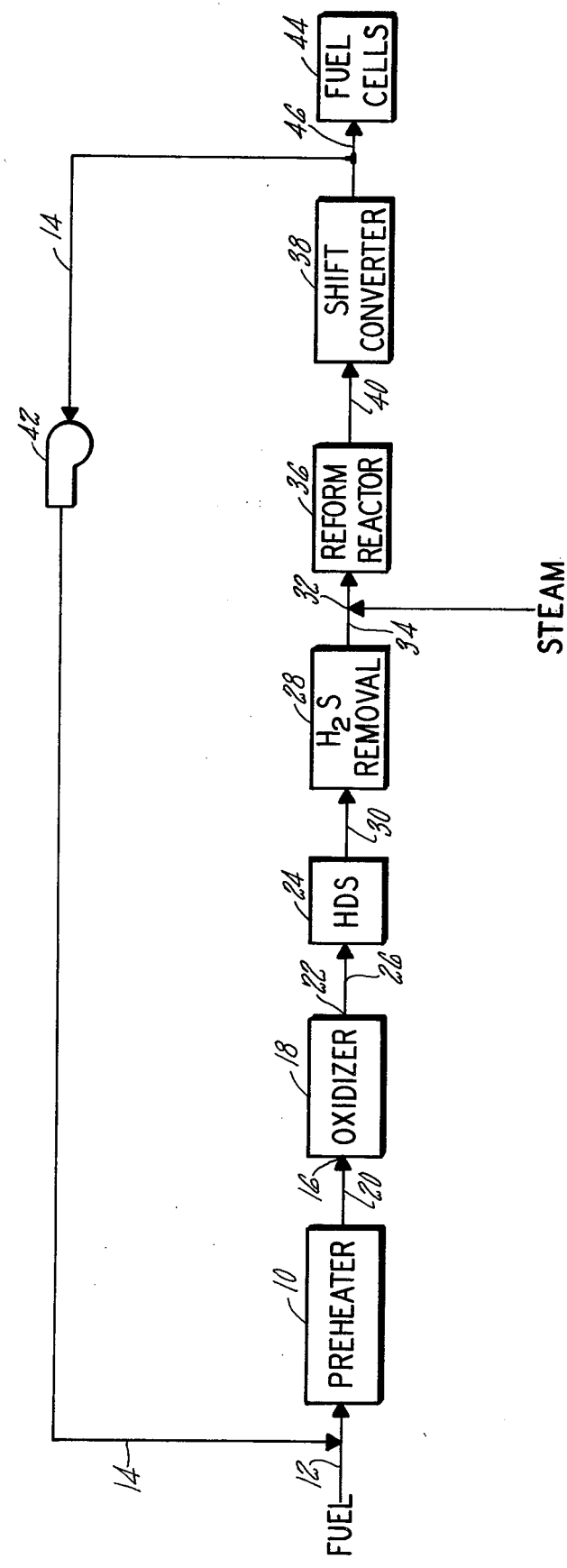

PROCESS FOR ALTERNATELY STEAM REFORMING SULFUR CONTAINING HYDROCARBONS THAT VARY IN OXYGEN CONTENT

BACKGROUND OF THE INVENTION

1. Field of the Invention

This invention relates to desulfurization of hydrocarbon feedstock.

2. Description of the Prior Art

In a hydrocarbon conversion system, such as for converting natural gas to hydrogen for use in a fuel cell or elsewhere, any sulfur in the hydrocarbon feedstock must usually be removed or reduced to extremely low levels. For example, in fuel cell power plants wherein a hydrocarbon fuel is steam reformed to produce hydrogen for the fuel cells, economic considerations relative to the life and performance of the steam reform reactor catalyst make it desirable to reduce the sulfur content of the fuel fed into the reactor to less than one part per million. Most raw fuels include at least 3 ppm sulfur. For example, natural gas usually contains about 4 ppm sulfur.

In a typical system a steam reforming reactor is preceded upstream by hydrotreating apparatus such as a hydrodesulfurizer (HDS) and an $H_2S$ removal device. The sulfur bearing hydrocarbon fuel and a small amount of hydrogen (usually bled from a point downstream of the reform reactor) is introduced into the HDS. In the HDS organic sulfur in the fuel combines with the hydrogen in the presence of, for example, sulfided nickel and sulfided molybdenum catalyst to form $H_2S$ plus a harmless hydrogenated organic analog in accordance with the following equation:

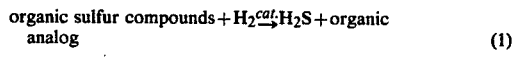

organic sulfur compounds + $H_2 \overset{cat}{\rightleftharpoons} H_2S$ + organic analog (1)

The effluent from the HDS is then introduced into hydrogen sulfide removal means, such as a bed of zinc oxide and/or charcoal which absorbs the hydrogen sulfide. The cleaned fuel may now be used in the reactor. Commonly owned U.S. Pat. Nos. 3,476,534 Buswell et al and 3,480,417 Setzer describe other fuel cell systems with sulfur removal means.

It is possible that the hydrocarbon fuel which is to be used as the feedstock in the steam reforming system is peak shaved natural gas. Peak shaved natural gas is used only during peak demand periods instead of normal natural gas. Thus, the steam reforming system must be capable of alternately operating on normal and peak shaved gas. Peak shaved natural gas is normal natural gas with propane and air added. A unit of peak shaved natural gas is typically about 55% methane, 25% propylene and propane, and 20% air. The propane provides additional gas for the peak loads. Since propane has a much higher heating value than normal natural gas, the addition of propane substantially increases the overall heating value of the gas; the air brings the heating value of the gas back to within the range of heating values for normal natural gas.

In a steam reforming system including an HDS the oxygen in peak shaved natural gas quickly renders the HDS catalyst ineffective by reacting with the sulfided nickel and the sulfided molybdenum catalyst to produce nickel oxide, molybdenum trioxide, and sulfur dioxide in accordance with the following equations:

$$7O_2 + 2Ni_3S_2 \rightarrow 6NiO + 4SO_2 \qquad (2)$$

$$7O_2 + 2MoS_2 \rightarrow 2MoO_3 + 4SO_2 \qquad (3)$$

Also, the oxygen competes with the sulfur for hydrogen which slows down reaction (1) above. Within only a few hours the catalyst is oxidized in accordance with equations (2) and (3) above, and reaction (1) no longer occurs to any significant extent.

One method for removing oxygen from a gas stream is to pass the gas stream, including hydrogen, through an oxidizer (i.e., a bed of oxidation catalyst). Some known oxidation catalysts are CoO, $MnO_2$, $Ag_2O$, and many noble metals such as palladium, platinum and rhodium. In an oxidizer, if the temperature is high enough, the oxygen in the hydrocarbon feedstock combines with the recycled hydrogen in the presence of the oxidation catalyst to form water and generate heat in accordance with the following reaction:

$$O_2 + 2H_2 \overset{cat}{\rightleftharpoons} 2H_2O + \text{heat} \qquad (4)$$

The lowest temperature at which oxidation of the hydrogen occurs is herein referred to as the ignition temperature.

Removing the oxygen from peak shaved natural gas upstream of the HDS by the foregoing method would, of course, solve the aforementioned oxidation problem; however, sulfur, which is present in both normal and peak shaved natural gas, is a known poison to oxidation catalysts. During operation on normal natural gas the oxidation catalyst is quickly poisoned by the sulfur. When the feedstock is changed to peak shaved natural gas the oxidation catalyst would be expected to be ineffective unless the inlet temperature were well over 100° F. (538° C.) whereby the sulfur would then burn in the presence of the oxygen. Even operation on peak shaved natural gas alone would be expected to poison an initially clean catalyst over a relatively short period of time unless very high operating temperatures were being used.

In some systems which utilize an HDS as part of a sulfur removal process it is required that the gases entering the HDS be below about 650° F. (343° C.) in order to prevent damage to the HDS catalyst. Thus, from an economic point of view it is desirable that the temperature of the effluent from apparatus immediately upstream of the HDS be not much higher than 650° F. so as to eliminate or reduce the need for expensive cooling equipment, i.e., heat exchangers. In accordance with equation (4) heat is generated in an oxidizer, and the temperature of the gases leaving the oxidizer is considerably higher than the entering gas temperature. Therefore, if an oxidizer were to be used upstream of the HDS, the temperature of the gases entering the oxidizer is preferably considerably lower than 650° F. At these low temperatures palladium, for example, is poisoned by the sulfur in normal natural gas. Also, at these low temperatures a silver oxide oxidation catalyst combines with the sulfur in normal natural gas to form silver sulfide. Once sulfided the ignition temperatures of these catalysts are well over 1000° F. Thus, when the fuel is suddenly changed to peak shaved natural gas, these oxidizers would not be expected to work at temperatures under 1000° F. Other oxidation catalysts would also be expected to behave similarly.

SUMMARY OF THE INVENTION

An object of the present invention is a process for removing oxygen from an oxygen and sulfur bearing hydrocarbon fuel.

A more particular object of the present invention is a process for removing oxygen from an oxygen and sulfur bearing hydrocarbon fuel, the process being capable of operating at relatively low temperatures.

According to the present invention oxygen is removed from a hydrocarbon fuel containing sulfur by introducing the fuel and some hydrogen into an oxidizer at a temperature of less than 1000° F., the oxidizer comprising a bed of platinum catalyst.

As happened with other oxidizing catalysts tested, it was initially expected that, at oxidizer inlet temperatures below 1000° F., the sulfur would prevent ignition. It was very surprising that ignition occurred and the sulfur was desorbed at temperatures as low as about 300° F. (149° C.).

In our preferred embodiment the oxygen is first removed in an oxidizer and the sulfur is then converted to $H_2S$ in a hydrodesulfurizer which uses nickel subsulfide and molybdenum disulfide catalyst. Because this catalyst is damaged by temperatures in excess of about 650° F., it is desirable that the effluent from the oxidizer be less than about 650° F. The temperature rise in the oxidizer will depend upon the amount of oxygen, unsaturated hydrocarbons, and non-reacting species in the inlet gases, but is usually on the order of 300° F. for peak shaved natural gas. Thus the inlet temperature to the oxidizer is preferably 350° F. (177° C.) or less, down to the minimum ignition temperature.

BRIEF DESCRIPTION OF THE DRAWING

The sole FIGURE is a schematic block diagram of a fuel cell system adapted to the practice of the instant process.

DESCRIPTION OF THE PREFERRED EMBODIMENTS

Referring to the drawing, a fuel containing oxygen, such as peak shaved natural gas is introduced into a preheater 10 along with hydrogen which has been added thereto from a conduit 14. In the preheater the mixture is raised to a temperature above the ignition temperature of the hydrogen but preferably low enough to ensure an exit temperature no greater than 650° F. The heated fuel and hydrogen mixture is introduced into the inlet 16 of an oxidizer 18 via a conduit 20. The oxidizer catalyst, platinum supported on alumina, had been sulfided by earlier operation on normal natural gas. Upon entering the oxidizer ignition of the hydrogen occurs in accordance with equation (4) above and the oxygen is consumed. The sulfur is also thereby simultaneously desorbed. The effluent or exhaust from the outlet 22 of the oxidizer 18 is introduced into the hydrodesulfurizer 24 via a conduit 26. In the hydrodesulfurizer the hydrogen and sulfur combine to form hydrogen sulfide in accordance with the reaction described by equation (1). The effluent from the hydrodesulfurizer is then introduced into the hydrogen sulfide removal device 28 via a conduit 30. The effluent from the hydrogen sulfide removal device is virtually sulfur free (less than 0.1 parts per million). It is combined with steam at 32 in conduit 34, and the steam and sulfur free fuel is steam reformed by well known means in the reform reactor 36. Effluent from the reactor 36 is introduced into a shift converter 38 via a conduit 40. In the shift converter 38 the well known shift conversion reaction converts carbon monoxide in the reform reactor effluent to additional hydrogen plus carbon dioxide. A recycle blower 42 in the conduit 14 pumps a portion of the shift converter effluent to the conduit 12 for the purpose of providing the hydrogen needed for the oxidizer and hydrodesulfurizer reactions. (Instead of a recycle blower 42, an ejector in conduit 12 could be used such as shown in aforementioned U.S. Pat. No. 3,480,417.) The remainder of the shift converter effluent is introduced into the fuel cells 44 via a conduit 46.

As a specific example of the present invention the oxidizer catalyst is platinum supported on alumina; the HDS catalyst is nickel subsulfide and molybdenum disulfide supported on alumina; and the $H_2S$ removal apparatus comprises a bed of zinc oxide. In conduit 12, 0.6 lbs/hr of peak shaved natural gas is mixed with 0.2 lbs/hr of shift converter effluent and the mixture is heated in preheater 10 to a temperature of 400° F. (204° C.). The peak shaved natural gas in this example includes 12 ppm sulfur and is, by volumn, 55% methane, 4% oxygen, 16% inerts (mostly nitrogen), 12.5% propane, and 12.5% propylene. The recycled shift converter effluent is, by volume, about 67% hydrogen, 15% $H_2O$, 16% $CO_2$, and 1.5% CO. The temperature of the gases in the oxidizer rises to a maximum of about 725° F. (385° C.) toward the center of the catalyst bed, but it is only about 650° F. at the exit 22 due to heat losses within the oxidizer. The effluent contains only about 0.2% oxygen by volume. Also, since the effluent temperature is no greater than 650° F. (the temperature which would be harmful to the HDS catalyst) there is no need for cooling.

The present invention is useful for hydrotreating any raw fuel containing sulfur and harmful amounts of oxygen. For example, any amount of oxygen greater than about 0.5%, by volume, will probably be unacceptably harmful to most HDS catalysts. Thus, a steam reforming process for generating hydrogen can alternately be operated on a hydrocarbon fuel containing substantially no oxygen and at least 3 ppm sulfur, and a hydrocarbon fuel containing at least 0.5 percent oxygen and at least 3 ppm sulfur. The method of the present invention can reduce oxygen content to less than 0.2% by volume. Note that in the example just given the fuel contained 4% oxygen and the maximum temperature rise in the oxidizer was about 325° F. (163° C.). If the fuel contained only about 1% oxygen the maximum temperature rise would likely be only about 50° F. This would permit an oxidizer inlet temperature as high as about 600° F. without the need for subsequent cooling.

Although the invention has been shown and described with respect to a preferred embodiment thereof, it should be understood by those skilled in the art that other various changes and omissions in the form and detail thereof may be made therein without departing from the spirit and scope of the invention.

Having thus described a typical embodiment of our invention, that which we claim as new and desire to secure by Letters Patent of the United States is:

1. A process for generating hydrogen by steam reforming, alternately, a hydrocarbon fuel containing substantially no oxygen and at least 3 ppm sulfur and a hydrocarbon fuel containing at least 0.5% oxygen by volume and at least 3 ppm sulfur, including the steps of
   operating said process on the substantially oxygen free fuel including the steps of mixing said substantially oxygen free fuel with hydrogen, passing said mixture through an oxidizer comprising a bed of supported platinum catalyst whereby said oxidizer catalyst is poisoned by the sulfur in the fuel, reducing the sulfur content of said fuel to less than 0.1 ppm by passing the effluent of the oxidizer through a hydrogen sulfide generator comprising a bed of catalyst which is poisoned by the presence of more than 0.2% by volume oxygen, removing the hydrogen sulfide from the hydrogen sulfide generator effluent, and steam reforming said generator effluent; and then operating said process on the oxygen and sulfur containing fuel including the steps of mixing said oxygen and sulfur containing fuel with hydrogen, preheating said mixture to at least the ignition temperature of the oxidizer but to less than 600° F., reducing the oxygen content of said preheated mixture to less than 0.5% by volume by passing it through said oxidizer, reducing the sulfur content of the oxidizer effluent to less than 0.1 ppm by passing it through the hydrogen sulfide generator, removing the hydrogen sulfide from the hydrogen sulfide generator effluent, and steam reforming said generator effluent in a reactor.

2. The process according to claim 1 wherein the hydrogen sulfide generator catalyst comprises supported sulfided nickel and sulfided molybdenum.

3. The process according to claim 1 wherein the steps of mixing the fuel with hydrogen includes mixing the fuel with hydrogen obtained from downstream of the reactor.

4. The process according to claim 3 wherein said mixture is preheated to 350° F. or less.

5. The process according to claim 2 wherein the temperature of the oxidizer effluent is no greater than 650° F.

6. The process according to claim 5 wherein said substantially oxygen free fuel is normal natural gas and said oxygen containing fuel is peak shaved natural gas.

* * * * *